US012123436B2

(12) United States Patent
Imamura et al.

(10) Patent No.: US 12,123,436 B2
(45) Date of Patent: Oct. 22, 2024

(54) CONTROL VALVE UNIT

(71) Applicant: Kubota Corporation, Osaka (JP)

(72) Inventors: Takuya Imamura, Sakai (JP); Yuichi Nagatomi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/563,169

(22) PCT Filed: Mar. 7, 2022

(86) PCT No.: PCT/JP2022/009597

§ 371 (c)(1),
(2) Date: Nov. 21, 2023

(87) PCT Pub. No.: WO2022/254851

PCT Pub. Date: Dec. 8, 2022

(65) Prior Publication Data

US 2024/0229830 A1 Jul. 11, 2024

(30) Foreign Application Priority Data

Jun. 1, 2021 (JP) ................................ 2021-092545

(51) Int. Cl.

| | |
|---|---|
| ***F15B 13/04*** | (2006.01) |
| ***E02F 9/22*** | (2006.01) |
| ***F15B 11/08*** | (2006.01) |

(52) U.S. Cl.
CPC ............ *F15B 13/04* (2013.01); *E02F 9/2278* (2013.01); *F15B 11/08* (2013.01)

(58) Field of Classification Search
CPC .................. F15B 11/024; F15B 13/021; F15B 2211/3127; F15B 11/08
See application file for complete search history.

(56) References Cited

U.S. PATENT DOCUMENTS 11,396,737 B2 * 7/2022 Wang .................... E02F 9/2228
2011/0283693 A1 * 11/2011 Ramler ................ F15B 11/024 60/461
2018/0100525 A1 * 4/2018 Vigholm ................ F15B 21/14

FOREIGN PATENT DOCUMENTS

JP 20231180 A 1/2023

* cited by examiner

*Primary Examiner* — Abiy Teka
(74) *Attorney, Agent, or Firm* — The Webb Law Firm

(57) ABSTRACT

A control valve unit includes a pilot-operated first operation valve 21 that can be operated to a first closed position at which a first oil passage 41 and a tank port 24 are disconnected from each other and a first open position at which the first oil passage 41 and the tank port 24 are connected to each other; and a pilot-operated second operation valve 22 that can be operated to a second closed position at which a second oil passage 42 and the tank port 24 are disconnected from each other and a second open position at which the second oil passage 42 and the tank port 24 are connected to each other.

4 Claims, 8 Drawing Sheets

CONTROL VALVE UNIT

CROSS-REFERENCE TO RELATED APPLICATIONS

This application is the United States national phase of International Application No. PCT/JP2022/009597 filed Mar. 7, 2022, and claims priority to Japanese Patent Application No. 2021-092545 filed Jun. 1, 2021, the disclosures of which are hereby incorporated by reference in their entireties.

BACKGROUND OF THE INVENTION

Field of the Invention

The present invention relates to a control valve unit having a floating function.

Description of Related Art

As disclosed in Patent Document 1, when a tractor, which is an example of a work vehicle, is equipped with a front loader, a double-acting boom cylinder (equivalent to a double-acting hydraulic actuator) for raising and lowering a boom of the front loader is provided. Due to the control valve that supplies and discharges hydraulic oil to and from the boom cylinder being operated at three positions, the boom cylinder performs a raising and lowering operation and a stopping operation on the boom.

In Patent Document 1, a floating position is provided for a control valve operated at three positions, and the control valve is configured to be operable at four positions. When the control valve is operated to the floating position, an oil chamber on a bottom side and an oil chamber on a rod side of the boom cylinder are connected to a tank, and the boom cylinder can freely extend and contract.

As a result, when traveling with a bucket in contact with a ground surface, the boom cylinder extends and contracts in such a manner that the bucket and the boom rise and lower according to the unevenness of the ground surface, and the bucket levels the ground surface.

PATENT DOCUMENTS

Patent Document 1: Japanese Patent Application Publication No. 2018-80761 (see FIG. 2)

However, since the technique disclosed in Patent Document 1 uses a control valve that can be operated at four positions, a spool length of the control valve increases, resulting in an increase in the size of the control valve unit including the control valve, which is problematic.

SUMMARY OF THE INVENTION

The present invention aims to reduce the size of the control valve unit having a floating function.

A control valve unit according to an aspect of the present invention includes: a pump port; a tank port; a first oil passage and a second oil passage configured to connect to a double-acting hydraulic actuator; a pilot-operated control valve including (i) a first position at which the first oil passage and the pump port are connected to each other and the second oil passage and the tank port are connected to each other, (ii) a second position at which the second oil passage and the pump port are connected to each other and the first oil passage and the tank port are connected to each other, and (iii) a neutral position, the control valve being biased to the neutral position; a pilot-operated first operation valve configured to be operated to (i) a first closed position at which the first oil passage and the tank port are disconnected from each other, and (ii) a first open position at which the first oil passage and the tank port are connected to each other; a pilot-operated second operation valve configured to be operated to (i) a second closed position at which the second oil passage and the tank port are disconnected from each other, and (ii) a second open position at which the second oil passage and the tank port are connected to each other; a first pilot valve configured to be operated to a first supply position at which pilot hydraulic oil is supplied to a port in the control valve configured to operate the control valve to the first position and a port in the second operation valve configured to operate the second operation valve to the second open position; and a second pilot valve configured to be operated to a second supply position at which pilot hydraulic oil is supplied to a port in the control valve configured to operate the control valve to the second position and a port in the first operation valve configured to operate the first operation valve to the first open position, in which in response to the first pilot valve being operated to the first supply position and the second pilot valve being operated to the second supply position, the control valve is operated to the neutral position, the first operation valve is operated to the first open position, and the second operation valve is operated to the second open position.

According to the above configuration, it is possible to obtain a control valve unit having a floating function by merely adding the first operation valve and the second operation valve to the configuration including the pilot-operated control valve having three positions, the first pilot valve, and the second pilot valve, and thus the control valve unit having a floating function can be made compact.

Also, the control valve may be configured in such a manner that at the neutral position, the first oil passage and the second oil passage are connected to the tank port, the first operation valve may be a pilot-operated first check valve that is provided on the first oil passage, and in response to being operated to the first closed position, allows flow of hydraulic oil from the control valve to the hydraulic actuator and blocks flow of hydraulic oil from the hydraulic actuator to the control valve, and upon receiving supply of pilot hydraulic oil, is operated to the first open position and allows flow of hydraulic oil from the hydraulic actuator to the control valve, and the second operation valve may be a pilot-operated second check valve that is provided on the second oil passage, and in response to being operated to the second closed position, allows flow of hydraulic oil from the control valve to the hydraulic actuator and blocks flow of hydraulic oil from the hydraulic actuator to the control valve, and upon receiving supply of pilot hydraulic oil, is operated to the second open position and allows flow of hydraulic oil from the hydraulic actuator to the control valve.

According to the above configuration, since the first check valve and the second check valve need only be provided on the first oil passage and the second oil passage, a control valve unit having a floating function can be realized with a simple configuration. Also, by using the first check valve and the second check valve as the first operation valve and the second operation valve, the amount of hydraulic oil that leaks when the first operation valve and the second operation valve are operated to the first closed position and the second closed position can be reduced compared to when using a two-position switching type on-off valve.

Also, the control valve unit may further include: a first oil drain passage connecting the first oil passage and the tank port; and a second oil drain passage connecting the second oil passage and the tank port, in which the control valve is configured in such a manner that at the neutral position, the first oil passage and the tank port are disconnected from each other and the second oil passage and the tank port are disconnected from each other, the first operation valve is a pilot-operated first on-off valve that is provided on the first oil drain passage, is configured to be operated to (i) the first closed position at which the first oil drain passage is blocked and (ii) the first open position at which the first oil drain passage is connected, is biased to the first closed position, and upon receiving supply of pilot hydraulic oil, is operated to the first open position, and the second operation valve is a pilot-operated second on-off valve that is provided on the second oil drain passage, is configured to be operated to (i) the second closed position at which the second oil drain passage is blocked and (ii) the second open position at which the second oil drain passage is connected, is biased to the second closed position, and upon receiving supply of pilot hydraulic oil, is operated to the second open position.

According to the above configuration, the first oil passage and the second oil passage need only be connected to the tank port via the first on-off valve and the second on-off valve, respectively, and therefore the control valve unit having a floating function can be realized with a simple configuration. Also, by using the two-position switching type first on-off valve and second on-off valve as the first operation valve and the second operation valve, the control valve unit can be realized at a lower cost compared to when the first check valve and the second check valve are used.

Also, the control valve unit may further include an oil drain passage connecting the second oil passage and the tank port, in which the control valve is configured in such a manner that at the neutral position, the first oil passage and the tank port are connected to each other and the second oil passage and the tank port are disconnected from each other, the first operation valve is a pilot-operated check valve that is provided on the first oil passage, and in response to being operated to the first closed position, allows flow of hydraulic oil from the control valve to the hydraulic actuator and blocks flow of hydraulic oil from the hydraulic actuator to the control valve, and upon receiving supply of pilot hydraulic oil, is operated to the first open position and allows flow of hydraulic oil from the hydraulic actuator to the control valve, and the second operation valve is a pilot-operated on-off valve that is provided on the oil drain passage, is configured to be operated to (i) the second closed position at which the oil drain passage is blocked and (ii) the second open position at which the oil drain passage is connected, is biased to the second closed position, and upon receiving supply of pilot hydraulic oil, is operated to the second open position.

According to the above configuration, the check valve need only be provided in the first oil passage and connected to the tank port via the on-off valve in the second oil passage, and therefore a control valve unit having a floating function can be realized with a simple configuration. Also, by using a check valve with a small amount of leakage in the first oil passage and an inexpensive two-position switching type on-off valve in the second oil passage, a control valve unit in which one oil passage has a smaller amount of leakage than another oil passage can be realized at a low cost.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

FIGS. 1 to 8 show a control valve unit 8 of the present invention and a tractor, which is an example of a work vehicle in which the control valve unit 8 of the present invention is mounted, where F indicates a frontward direction, B indicates a rearward direction, U indicates an upward direction, and D indicates a downward direction.

Overall Configuration of Tractor

Figure 1:
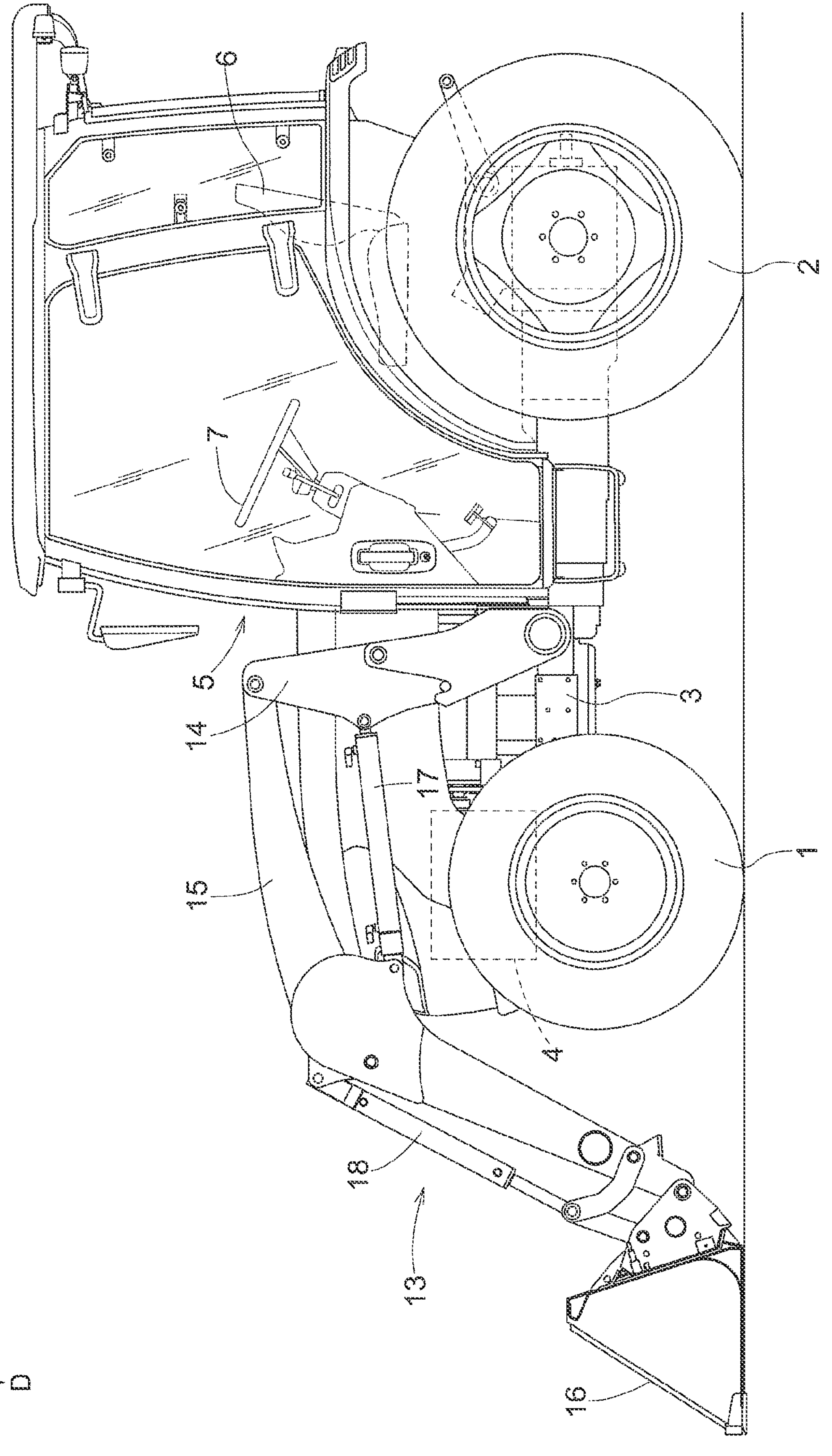
FIG. 1 is a left side view of a tractor.
Figure 1:
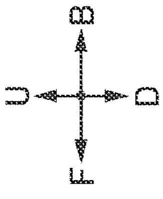

As shown in FIG. 1, a body 3 is supported by left and right front wheels 1 and left and right rear wheels 2, an engine 4 is supported at a front section of the body 3, and a driving section 5 is provided in the body 3. The driving section 5 is provided with a driver's seat 6, a steering wheel 7 for steering the front wheels 1, and the like.

The body 3 supports a front loader 13. Left and right support frames 14 are connected to right and left sections of the body 3 and extend upward. Left and right booms 15 are supported on an upper section of the support frame 14 in such a manner as to be swingable up and down and extend frontward, and a bucket 16 is supported on the front ends of the left and right booms 15 in such a manner as to be swingable up and down.

Left and right double-acting boom cylinders 17 (corresponding to double-acting hydraulic actuators) are connected spanning between the support frame 14 and the booms 15. Left and right double-acting bucket cylinders 18 are connected spanning between the booms 15 and the bucket 16. By extending and contracting the boom cylinders 17, the booms 15 are raised and lowered, and by extending and contracting the bucket cylinders 18, the bucket 16 is swung up and down.

As described above, the front loader 13 includes the support frame 14, the booms 15, the bucket 16, the boom cylinders 17, the bucket cylinders 18, and the like.

Overall Configuration of Control Valve Unit

Figure 2:
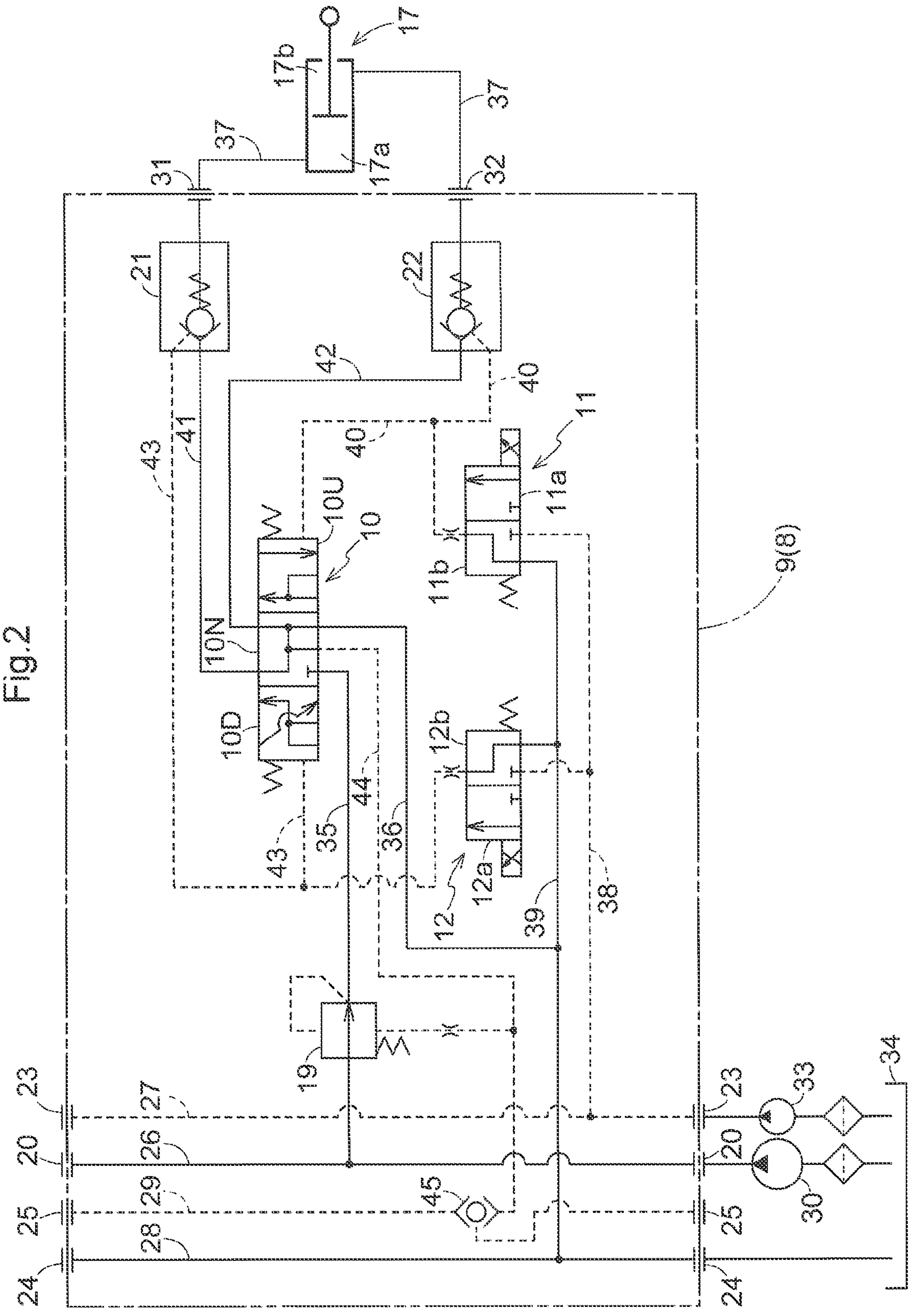
FIG. 2 is a hydraulic circuit diagram showing a state in which a control valve is operated to a neutral position in a control valve unit.

As shown in FIG. 2, a control valve unit 8 for supplying and discharging hydraulic oil to and from the boom cylinders 17 is provided, and the control valve unit 8 is configured as described below.

A block-shaped valve case 9 is provided, which accommodates a control valve 10, a first pilot valve 11, a second pilot valve 12, a first check valve 21 (corresponding to the first operation valve), a second check valve 22 (corresponding to a second operation valve), an on-off valve 19, and the like.

The valve case 9 is provided with a pair of pump ports 20, a pair of pilot ports 23, a pair of tank ports 24, a pair of signal ports 25, a first port 31, and a second port 32.

A pump oil passage 26 is connected spanning between the pair of pump ports 20, and a pilot oil passage 27 is connected spanning between the pair of pilot ports 23. A tank oil passage 28 is connected spanning between the pair of tank ports 24, and a signal oil passage 29 is connected spanning between the pair of signal ports 25.

The control valve unit 8 shown in FIG. 2 and a plurality of other control valve units 8 are used while connected with each other, and in the adjacent control valve units 8, the pump ports 20, the pilot ports 23, the tank port 24, and the signal ports 25 are connected to each other.

A hydraulic pump 30 and a pilot pump 33 are mounted on the body 3 and are driven by the engine 4. The hydraulic pump 30 supplies lubricating oil from a transmission case 34 (corresponding to a tank) mounted on the body 3 to the pump port 20 and the pump oil passage 26 as hydraulic oil. The pilot pump 33 supplies lubricating oil from the mission case 34 to the pilot port 23 and the pilot oil passage 27 as pilot hydraulic oil. The tank port 24 and the tank oil passage 28 are connected to the transmission case 34.

Configuration of Control Valve in Control Valve Unit

As shown in FIG. 2, the control valve 10 is configured as a pilot-operated type that has three positions, namely a first position 10U, a second position 10D, and a neutral position 10N, is biased to the neutral position 10N by a pair of springs, and can be operated to the first position 10U and the second position 10D by being supplied with pilot hydraulic oil.

More specifically, a pilot oil passage 43 is connected to one end of a spool of the control valve 10, and a pilot oil passage 40 is connected to the other end. When pilot hydraulic oil is supplied only to the pilot oil passage 43 out of the pilot oil passages 40 and 43, the control valve 10 is operated to the first position 10U, when pilot hydraulic oil is supplied only to the pilot oil passage 40, the control valve 10 is operated to the second position 10D, and in response to pilot hydraulic oil being supplied to both of the pilot oil passages 40 and 43, the control valve 10 is operated to the neutral position 10N.

An oil passage 35 is connected spanning between the control valve 10 and the pump oil passage 26, and the on-off valve 19 is provided on the oil passage 35. An oil passage 36 is connected spanning between the control valve 10 and the tank oil passage 28, and an oil passage 44 is connected spanning between the control valve 10 and the signal oil passage 29. A first oil passage 41 is connected spanning between the control valve 10 and the first port 31, and a second oil passage 42 is connected spanning between the control valve 10 and the second port 32.

Outside the control valve unit 8, a hydraulic hose 37 is connected spanning between the first port 31 and the oil chamber 17*a* on the bottom side of the boom cylinder 17, and a hydraulic hose 37 is connected spanning between the second port 32 and the oil chamber 17*b* on the rod side of the boom cylinder 17.

In response to the control valve 10 being operated to the first position 10U, the first oil passage 41 and the pump oil passage 26 are connected to each other, and the second oil passage 42 and the tank oil passage 28 are connected to each other.

In response to the control valve 10 being operated to the second position 10D, the second oil passage 42 and the pump oil passage 26 are connected to each other, and the first oil passage 41 and the tank oil passage 28 are connected to each other.

In response to the control valve 10 being operated to the neutral position 10N, the first oil passage 41 and the second oil passage 42 are connected to the tank oil passage 28.

Configuration of First Pilot Valve, Second Pilot Valve, First Check Valve, and Second Check Valve in Control Valve Unit As shown in FIG. 2, the first check valve 21 is configured as a pilot-operated type, is provided on the first oil passage 41, and is operated by pilot hydraulic oil supplied via the pilot oil passage 43. The first check valve 21 is in a closed state (corresponding to a first closed position) when pilot hydraulic oil is not being supplied to the pilot oil passage 43, and in the closed state, the flow of hydraulic oil to the first port 31 and the boom cylinders 17 in the first oil passage 41 is allowed, and the flow of hydraulic oil to the control valve 10 in the first oil passage 41 is blocked.

In response to the pilot hydraulic oil being supplied to the first check valve 21 via the pilot oil passage 43, the first check valve 21 is operated to the open state (corresponding to a first open position), and the flow of hydraulic oil from the first port 31 to the control valve 10 is allowed. Also, as described above, in response to the pilot hydraulic oil being supplied to the pilot oil passage 43, the control valve 10 is at the neutral position 10N or the second position 10D, and the first port 31 and the tank oil passage 28 are connected to each other via the control valve 10.

The second check valve 22 is configured as a pilot-operated type, is provided on the second oil passage 42, and operates by pilot hydraulic oil supplied via the pilot oil passage 40. The second check valve 22 is in a closed state (corresponding to a second closed position) when pilot hydraulic oil is not being supplied to the pilot oil passage 40, and in the closed state, the flow of hydraulic oil to the second port 32 and the boom cylinder 17 in the second oil passage 42 is allowed, and the flow of hydraulic oil to the control valve 10 in the second oil passage 42 is blocked.

When the pilot hydraulic oil is supplied to the second check valve 22 via the pilot oil passage 40, the second check valve 22 is operated to the open state (corresponding to a second open position), and the flow of hydraulic oil from the second port 32 to the control valve 10 is allowed. Also, when the pilot hydraulic oil is being supplied to the pilot oil passage 40 as described above, the control valve 10 is operated to the neutral position 10N or the first position 10U, and the second port 32 and the tank oil passage 28 are connected to each other via the control valve 10.

The first pilot valve 11 is configured as an electromagnetic operation type that has two positions, namely a first supply position 11*a* and a first non-supply position 11*b*, is biased to the first non-supply position 11*b* by a spring, and can be operated to the first supply position 11*a* by a magnetic solenoid.

The second pilot valve 12 is configured as an electromagnetic operation type that has two positions, namely a second supply position 12*a* and a second non-supply position 12*b*, is biased to the second non-supply position 12*b* by a spring, and can be operated to the second supply position 12*a* by an electromagnetic solenoid.

The primary sides of the first pilot valve 11 and the second pilot valve 12 are connected to the pilot oil passage 27 via the oil passage 38, and are connected to the tank oil passage 28 (oil passage 36) via the oil passage 39.

The secondary side of the first pilot valve 11 is connected to the control valve 10 and the second check valve 22 via the pilot oil passage 40. The secondary side of the second pilot valve 12 is connected to the control valve 10 and the first check valve 21 via the pilot oil passage 43. Each of the pilot oil passages 40 and 43 is provided with a throttle. Note that these throttles may also be formed in the internal oil passages of the first pilot valve 11 and the second pilot valve 12.

State in which Control Valve is Operated to Neutral Position in Control Valve Unit The state shown in FIG. 2 is a state in which the first pilot valve 11 and the second pilot valve 12 have been operated to the first non-supply position 11*b* and the second non-supply position 12*b*.

In this state, the pilot oil passages 40 and 43 are connected to the tank oil passage 28 via the first pilot valve 11 and the second pilot valve 12, and therefore pilot hydraulic oil is not supplied to the control valve 10, and the control valve 10 is operated by a spring to the neutral position 10N. Also, the pilot hydraulic oil is not supplied to the first check valve 21 and the second check valve 22, and the first check valve 21 and the second check valve 22 are in a closed state.

The first check valve 21 blocks the flow of hydraulic oil from the first port 31 to the control valve 10 in the first oil passage 41, the second check valve 22 blocks the flow of hydraulic oil from the second port 32 to the control valve 10 in the second oil passage 42, and the boom cylinder 17 is stopped.

Figure 3:
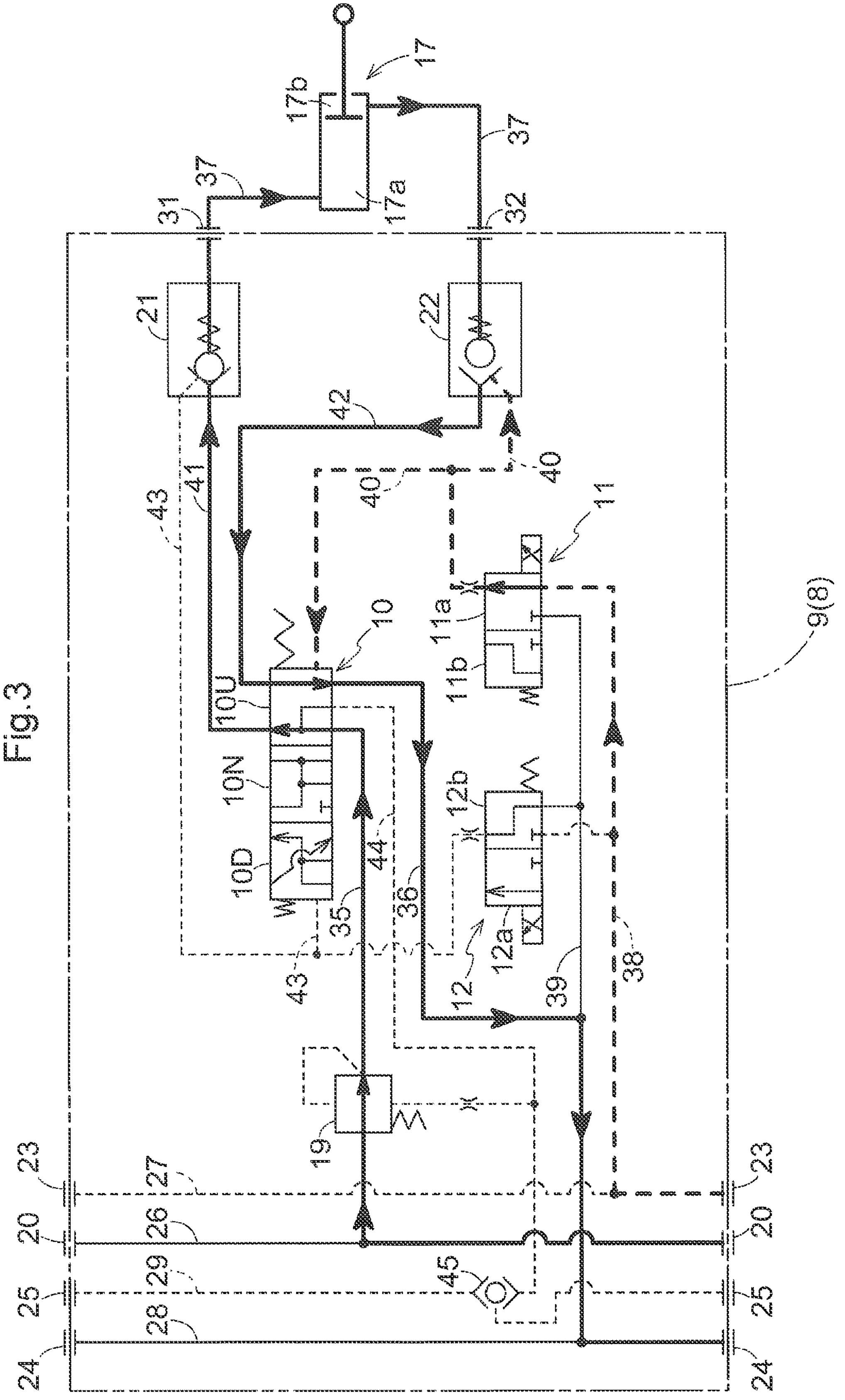
FIG. 3 is a hydraulic circuit diagram showing a state in which the control valve is operated to a first position in the control valve unit.

State in which Control Valve is Operated to First Position in Control Valve Unit As shown in FIG. 3, when the first pilot valve 11 is operated to the first supply position 11*a* and the second pilot valve 12 is operated to the second non-supply position 12*b*, pilot hydraulic oil is supplied to the control valve 10 via the pilot oil passage 40 to operate the control valve 10 to the first position 10U, and pilot hydraulic oil is supplied to the second check valve 22 to operate the second check valve 22 to the open state. In this state, the first check valve 21 is in a closed state.

The hydraulic oil in the pump oil passage 26 is supplied to the oil chamber 17*a* of the boom cylinder 17 via the oil passage 35, the on-off valve 19, the first position 10U of the control valve 10, the first oil passage 41, the first check valve 21, the first port 31, and the hydraulic hose 37.

The hydraulic oil in the oil chamber 17*b* of the boom cylinder 17 is discharged to the tank oil passage 28 via the hydraulic hose 37, the second port 32, the second check valve 22 in the open state, the second oil passage 42, the first position 10U of the control valve 10, and the oil passage 36.

As a result, the boom cylinder 17 is extended, and the boom 15 is raised.

The on-off valve 19 is biased to the open position, and the on-off valve 19 is operated to the closed position in response to the load applied to the boom cylinder 17 becoming large and the pressure in the oil passage 35 becoming a set value or higher.

The signal pressure is taken out at the first position 10U of the control valve 10, the signal pressure is supplied to a high-pressure selection valve 45 via the oil passage 44, and the higher signal pressure out of the signal pressure taken out at the first position 10U of the control valve 10 and the signal pressure of the signal oil passage 29 is supplied from the high-pressure selection valve 45 to the signal port 25 via the signal oil passage 29. The highest signal pressure among the signal pressures of the plurality of control valve units 8 is transmitted to a control device (not shown) mounted in the body 3.

Figure 4:
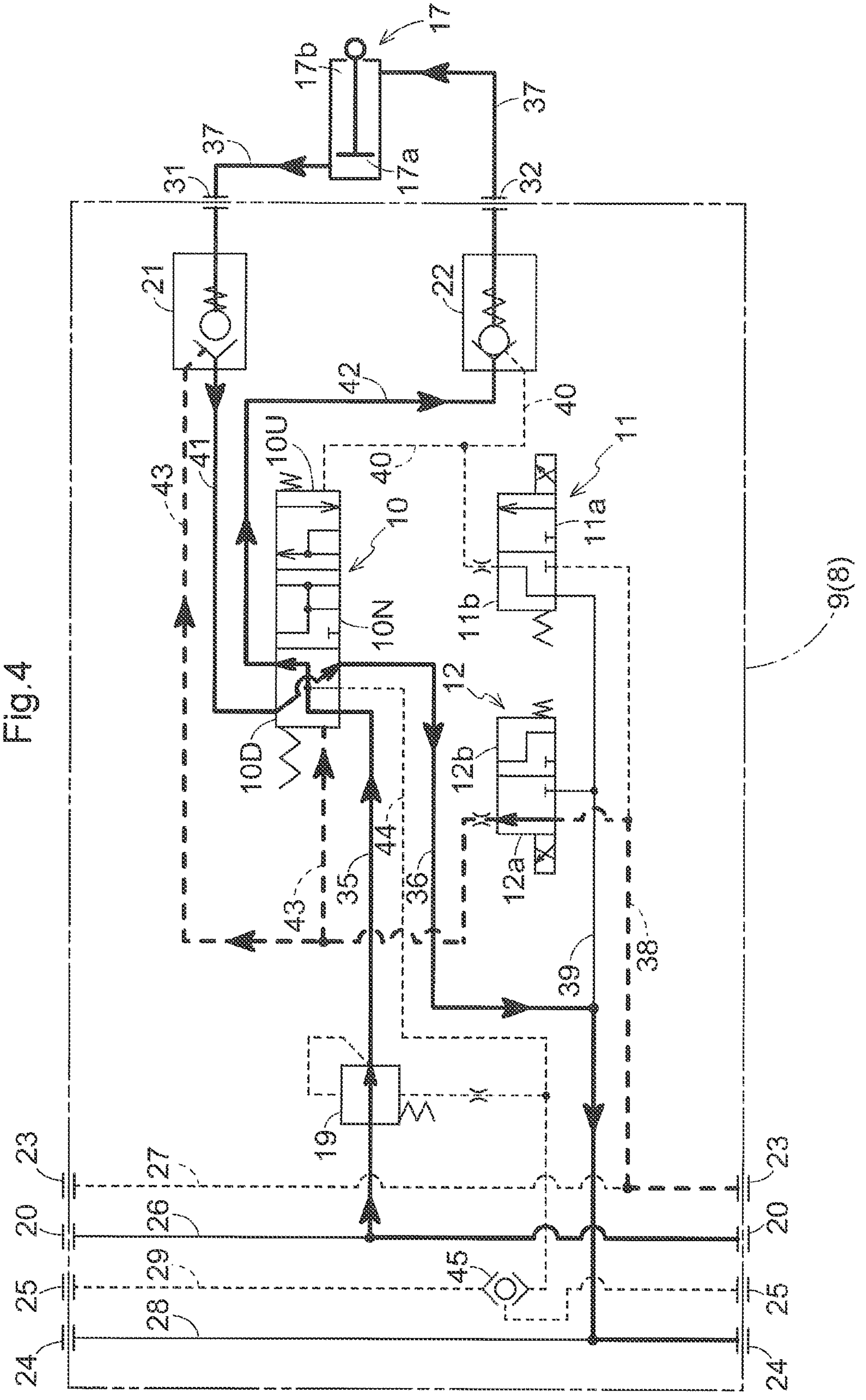
FIG. 4 is a hydraulic circuit diagram showing a state in which the control valve is operated to a second position in the control valve unit.

State in which Control Valve is Operated to Second Position in Control Valve Unit As shown in FIG. 4, in response to the second pilot valve 12 being operated to the second supply position 12*a* and the first pilot valve 11 being operated to the first non-supply position 11*b*, pilot hydraulic oil is supplied to the control valve 10 via the pilot oil passage 43 to operate the control valve 10 to the second position 10D, and pilot hydraulic oil is supplied to the first check valve 21 to operate the first check valve 21 to the open state. In this state, the second check valve 22 is in a closed state.

The hydraulic oil in the pump oil passage 26 is supplied to the oil chamber 17*b* of the boom cylinder 17 via the oil passage 35, the on-off valve 19, the second position 10D of the control valve 10, the second oil passage 42, the second check valve 22, the second port 32, and the hydraulic hose 37.

The hydraulic oil in the oil chamber 17*a* of the boom cylinder 17 is discharged to the tank oil passage 28 via the hydraulic hose 37, the first port 31, the first check valve 21 in the open state, the first oil passage 41, the second position 10D of the control valve 10, and the oil passage 36.

As a result, the boom cylinder 17 contracts, and the boom 15 is lowered.

The on-off valve 19 is biased to the open position, and when the load applied to the boom cylinder 17 becomes large and the pressure in the oil passage 35 becomes a set value or higher, the on-off valve 19 is operated to the closed position.

The signal pressure is taken out at the second position 10D of the control valve 10, the signal pressure is supplied to the high-pressure selection valve 45 via the oil passage 44, and the higher signal pressure out of the signal pressure taken out at the second position 10D of the control valve 10 and the signal pressure of the signal oil passage 29 is supplied from the high-pressure selection valve 45 to the signal port 25 via the signal oil passage 29. The highest signal pressure among the signal pressures of the plurality of control valve units 8 is transmitted to a control device (not shown) mounted in the body 3.

Floating State Achieved by Control Valve Unit

Figure 5:
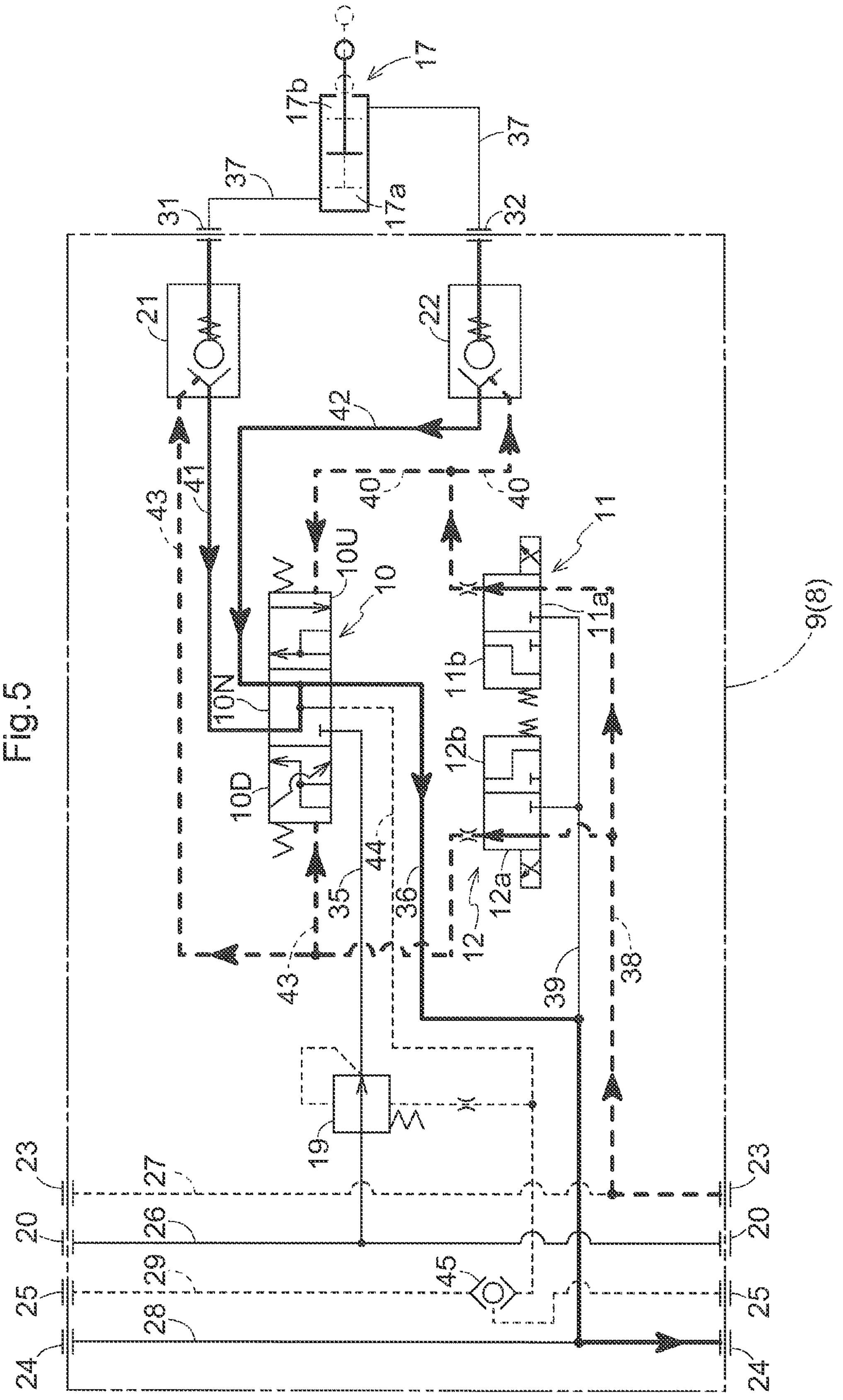
FIG. 5 is a hydraulic circuit diagram showing a floating state achieved by the control valve unit.

As shown in FIG. 5, in response to the first pilot valve 11 and the second pilot valve 12 being operated to the first supply position 11*a* and the second supply position 12*a*, pilot hydraulic oil is supplied to both ends of the spool of the control valve 10 via the pilot oil passages 40 and 43, pilot hydraulic oil is supplied to the first check valve 21 and the second check valve 22, and the first check valve 21 and the second check valve 22 are operated to the open state.

In this case, the pilot hydraulic oil of the first pilot valve 11 and the pilot hydraulic oil of the second pilot valve 12 act on the control valve 10 in mutually opposite directions and cancel each other out, and therefore the control valve 10 is operated to the neutral position 10N.

The oil chamber 17*a* of the boom cylinder 17 is connected to the tank oil passage 28 via the hydraulic hose 37, the first port 31, the first check valve 21 in the open state, the first oil passage 41, the neutral position 10N of the control valve 10, and the oil passage 36.

The oil chamber 17*b* of the boom cylinder 17 is connected to the tank oil passage 28 via the hydraulic hose 37, the second port 32, the second check valve 22 in the open state, the second oil passage 42, the neutral position 10N of the control valve 10, and the oil passage 36.

As a result, the boom cylinder 17 enters a floating state in which it can be expanded and contracted.

First Alternative Embodiment of the Invention

Figure 6:
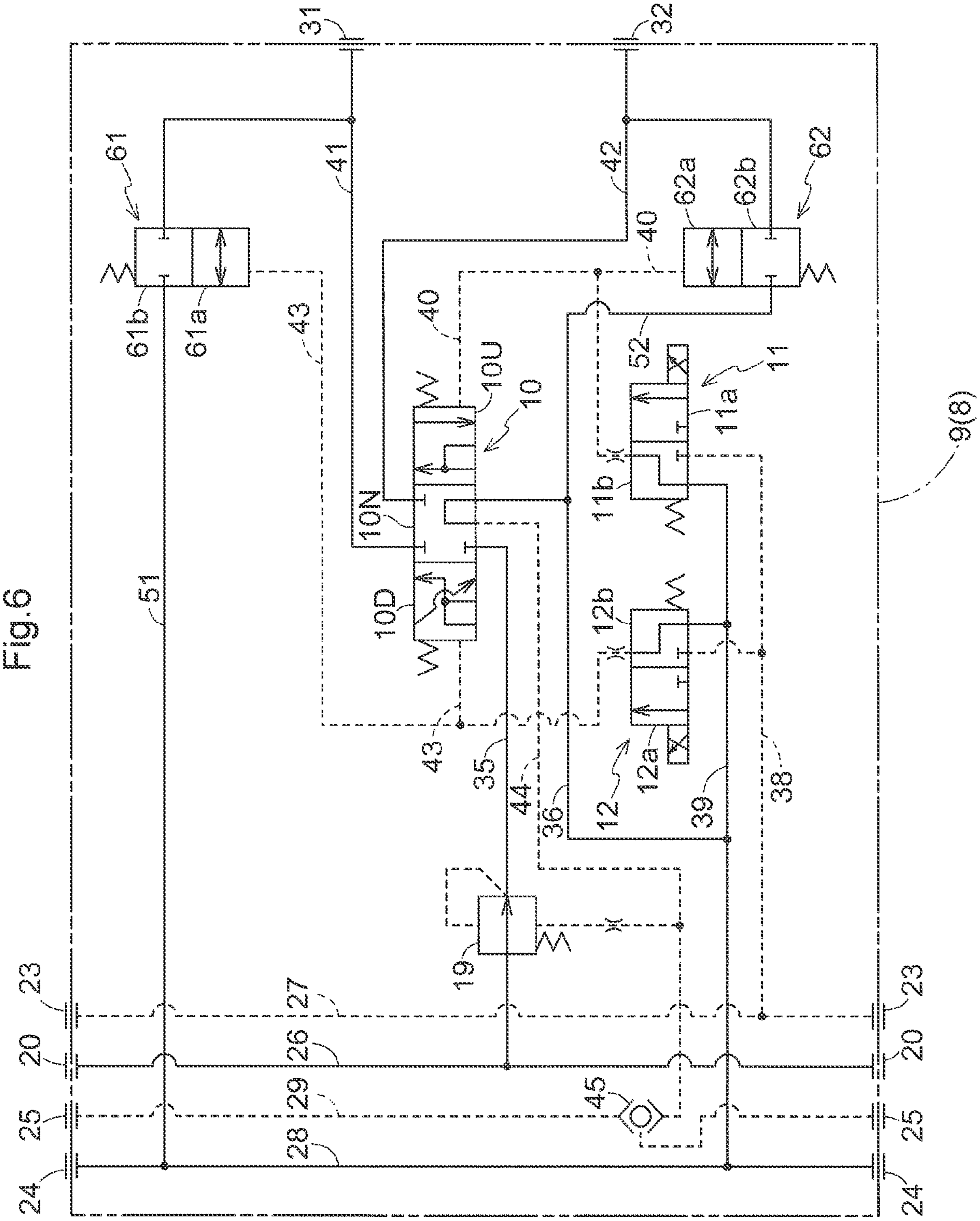
FIG. 6 is a hydraulic circuit diagram showing a state in which a control valve is operated to a neutral position in a control valve unit according to a first alternative embodiment of the invention.

The control valve unit 8 may also be configured as shown in FIG. 6.

Overall Configuration of Control Valve Unit of First Alternative Embodiment of the Invention The control valve unit 8 according to the first alternative embodiment shown in FIG. 6 includes a first oil drain passage 51 that connects the first oil passage 41 and the tank oil passage 28 and a first on-off valve 61 (corresponding to a first operation valve) provided on the first oil drain passage 51, instead of the first check valve 21 shown in FIG. 2.

The first on-off valve 61 is configured as a pilot-operated type that is connected to the pilot oil passage 43, can be operated to a first closed position 61*b* at which the first oil drain passage 51 is blocked and a first open position 61*a* at which the first oil drain passage 51 is connected, is biased to the first closed position 61*b*, and is operated to the first open position 61*a* in response to pilot hydraulic oil being supplied through the pilot oil passage 43.

Also, the control valve unit 8 of the first alternative embodiment shown in FIG. 6 includes a second oil drain passage 52 that connects the second oil passage 42 and the tank oil passage 28 via the oil passage 36 and a second on-off valve 62 (corresponding to a second operation valve) provided in the second oil drain passage 52, instead of the second check valve 22 shown in FIG. 2.

The second on-off valve 62 is configured as a pilot-operated type that is connected to the pilot oil passage 40, can be operated to a second closed position 62*b* at which the second oil drain passage 52 is blocked and a second open position 62*a* at which the second oil drain passage 52 is connected, is biased to the second closed position 62*b*, and is operated to the second open position 62*a* in response to pilot hydraulic oil being supplied via the pilot oil passage 40.

The pilot oil passage 40 is connected to one end of the spool of the control valve 10, the second on-off valve 62, and the first pilot valve 11, and the pilot oil passage 43 is connected to the other end of the spool of the control valve 10, the first on-off valve 61, and the second pilot valve 12. At the neutral position 10N of the control valve 10, the first oil passage 41 and the second oil passage 42 are blocked.

In FIG. 6, the configurations other than the above description are the same as in FIG. 2.

State in which Control Valve is Operated to Neutral Position in Control Valve Unit of First Alternative Embodiment of the Invention In the state shown in FIG. 6, pilot oil is not supplied to the pilot oil passages 40 and 43, and the first pilot valve 11 and the second pilot valve 12 have been operated to the first non-supply position 11*b* and the second non-supply position 12*b*.

In this state, pilot hydraulic oil is not supplied to the one end and the other end of the spool of the control valve 10, and the control valve 10 is operated to the neutral position 10N by a spring. Also, since pilot hydraulic oil is not supplied to the first on-off valve 61 and the second on-off valve 62, the first on-off valve 61 and the second on-off valve 62 are operated to the first closed position 61*b* and the second closed position 62*b*.

The flow of hydraulic oil from the first oil passage 41 to the tank oil passage 28 via the control valve 10 is blocked, and the flow of hydraulic oil from the first oil passage 41 to the tank oil passage 28 via the first oil drain passage 51 and the first on-off valve 61 is blocked.

The flow of hydraulic oil from the second oil passage 42 to the tank oil passage 28 via the control valve 10 is blocked, and the flow of hydraulic oil from the second oil passage 42 to the tank oil passage 28 via the second oil drain passage 52 and the second on-off valve 62 is blocked.

This causes the boom cylinder 17 to stop.

State in which Control Valve is Operated to First Position in Control Valve Unit of First Alternative Embodiment of the Invention In FIG. 6, in response to the first pilot valve 11 being operated to the first supply position 11*a* and the second pilot valve 12 being operated to the second non-supply position 12*b*, pilot hydraulic oil is supplied to the control valve 10, the control valve 10 is operated to the first position 10U, pilot hydraulic oil is supplied to the second on-off valve 62, and the second on-off valve 62 is operated to the second open position 62*a*.

As a result, the hydraulic oil from the pump oil passage 26 is supplied to the oil chamber 17*a* of the boom cylinder 17 via the oil passage 35, the on-off valve 19, the control valve 10, the first oil passage 41, the first port 31, and the hydraulic hose 37. Also, due to the first on-off valve 61 being operated to the first closed position 61*b*, the flow of hydraulic oil to the boom cylinder 17 in the first oil passage 41 is allowed.

Also, the hydraulic oil in the oil chamber 17*b* of the boom cylinder 17 is discharged to the tank oil passage 28 via the hydraulic hose 37, the second port 32, the second oil passage 42, the control valve 10, and the oil passage 36, and is discharged to the tank oil passage 28 via the second oil drain passage 52 and the second on-off valve 62.

This causes the boom cylinder 17 to extend.

State in which Control Valve is Operated to Second Position in Control Valve Unit of First Alternative Embodiment of the Invention In FIG. 6, in response to the first pilot valve 11 being operated to the first non-supply position 11*b* and the second pilot valve 12 being operated to the second supply position 12*a*, pilot hydraulic oil is supplied to the control valve 10, the control valve 10 is operated to the second position 10D, pilot hydraulic oil is supplied to the first on-off valve 61, and the first on-off valve 61 is operated to the first open position 61*a*.

As a result, the hydraulic oil from the pump oil passage 26 is supplied to the oil chamber 17*b* of the boom cylinder 17 via the oil passage 35, the on-off valve 19, the control valve 10, the second oil passage 42, the second port 32, and the hydraulic hose 37. Also, due to the second on-off valve 62 being operated to the second closed position 62*b*, the flow of hydraulic oil to the boom cylinder 17 in the second oil passage 42 is allowed.

Also, the hydraulic oil in the oil chamber 17*a* of the boom cylinder 17 is discharged to the tank oil passage 28 via the hydraulic hose 37, the first port 31, the first oil passage 41, the control valve 10, and the oil passage 36, and is discharged to the tank oil passage 28 via the first oil drain passage 51 and the first on-off valve 61.

This causes the boom cylinder 17 to contract.

Floating State Achieved by Control Valve Unit of First Alternative Embodiment of the Invention In FIG. 6, when the first pilot valve 11 and the second pilot valve 12 are operated to the first supply position 11*a* and the second supply position 12*a*, pilot hydraulic oil is supplied to both ends of the spool of the control valve 10, pilot hydraulic oil is supplied to the first on-off valve 61 and the second on-off valve 62, the control valve 10 is operated to the neutral position 10N, and the first on-off valve 61 and the second on-off valve 62 are operated to the first open position 61*a* and the second open position 62*a*.

As a result, the oil chamber 17*a* of the boom cylinder 17 is connected to the tank oil passage 28 via the hydraulic hose 37, the first port 31, the first on-off valve 61, and the first oil drain passage 51.

Also, the oil chamber 17*b* of the boom cylinder 17 is connected to the tank oil passage 28 via the hydraulic hose 37, the second port 32, the second on-off valve 62, and the second oil drain passage 52.

As a result, the boom cylinder 17 enters a floating state in which it can be expanded and contracted.

Second Alternative Embodiment of the Invention

Figure 7:
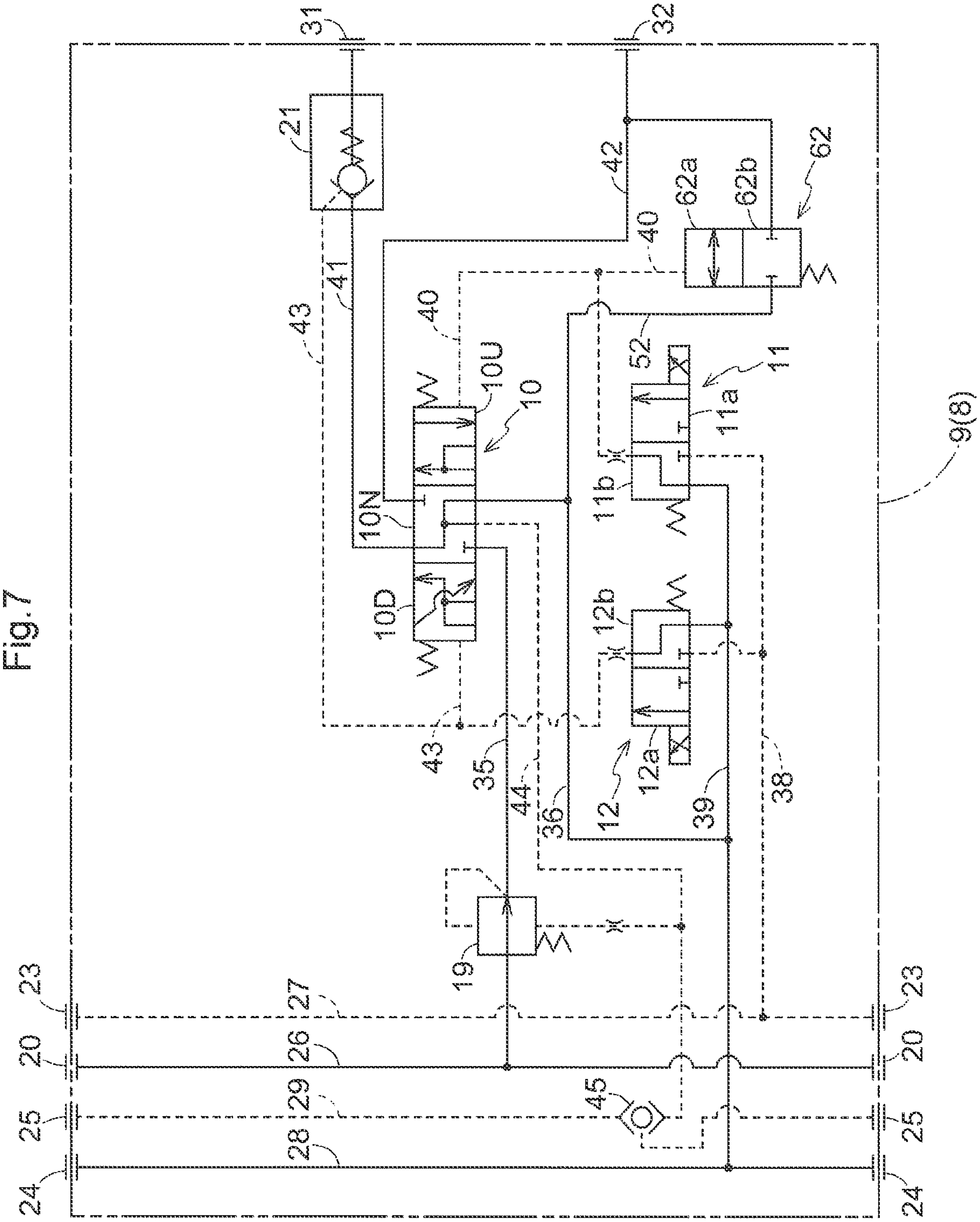
FIG. 7 is a hydraulic circuit diagram showing a state in which a control valve is operated to a neutral position in a control valve unit according to a second alternative embodiment of the invention.

The control valve unit 8 may also be configured as shown in FIG. 7.

The first oil passage 41 is provided with a first check valve 21 (corresponding to a check valve) as in FIG. 2, and the second oil passage 42 is connected to the tank oil passage 28 via a second oil drain passage 52 (corresponding to an oil drain passage) provided with a second on-off valve 62 (corresponding to a second operation valve and an on-off valve), and the oil passage 36 as in FIG. 6. The operation of the control valve 10 and the first check valve 21 is the same as that of the control valve unit 8 shown in FIG. 2, and the operation of the second on-off valve 62 is the same as that of the control valve unit 8 shown in FIG. 6.

Third Alternative Embodiment of the Invention

Figure 8:
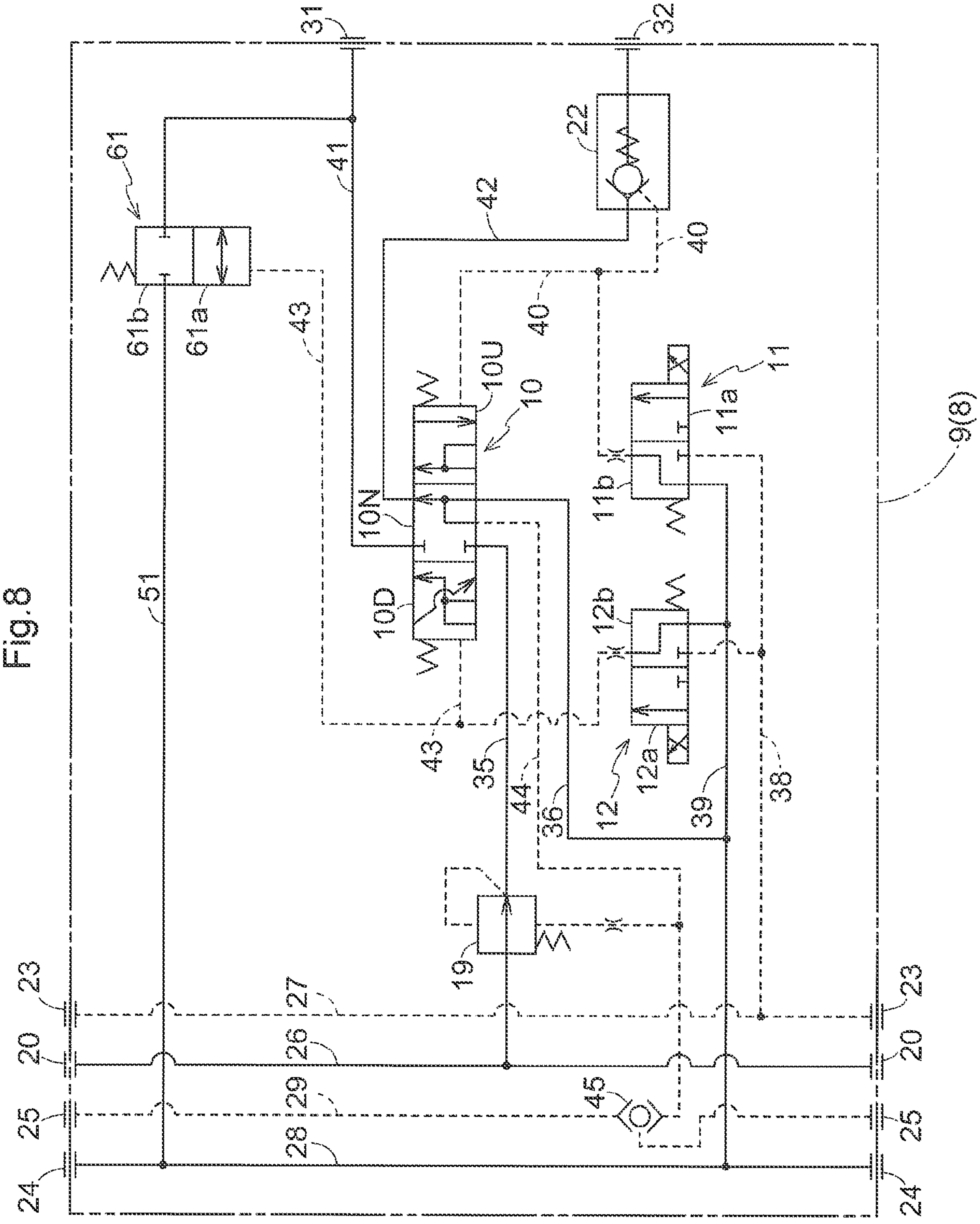
FIG. 8 is a hydraulic circuit diagram showing a state in which a control valve is operated to a neutral position in a control valve unit according to a third alternative embodiment of the invention.

The control valve unit 8 may also be configured as shown in FIG. 8.

The first oil passage 41 is connected to the tank oil passage 28 via a first oil drain passage 51 (corresponding to an oil drainage passage) provided with a first on-off valve 61 (corresponding to a first operation valve and an on-off valve) and an oil passage 36, as shown in FIG. 6, and the second oil passage 42 is provided with a second check valve 22 (corresponding to a check valve) as in FIG. 2. The operation of the control valve 10 and the first on-off valve 61 is the same as that of the control valve unit 8 shown in FIG. 6, and the operation of the second check valve 22 is the same as that of the control valve unit 8 shown in FIG. 2.

Fourth Alternative Embodiment of the Invention

In the second alternative embodiment of the invention shown in FIG. 7, when the first port 31, the first oil passage 41, the first check valve 21, and the like are replaced with the second port 32, the second oil passage 42, the second check valve 22, and the like, and the second port 32, the second oil passage 42, the second on-off valve 62, the second oil drain path 52, and the like are replaced with the first port 31, the first oil passage 41, the first on-off valve 61, the first oil drain passage 51, and the like, the second alternative embodiment of the invention shown in FIG. 7 is the same as the third alternative embodiment of the invention shown in FIG. 8.

Fifth Alternative Embodiment of the Invention

In the third alternative embodiment of the invention shown in FIG. 8, when the first port 31, the first oil passage 41, the first on-off valve 61, the first oil drain passage 51, and the like are replaced with the second port 32, the second oil passage 42, the second on-off valve 62, the second oil drain passage 52, and the like, and the second port 32, the second oil passage 42, the second check valve 22, and the like are replaced with the first port 31, the first oil passage 41, the first check valve 21, and the like, the third alternative embodiment of the invention shown in FIG. 8 is the same as the second alternative embodiment of the invention shown in FIG. 7.

Sixth Alternative Embodiment of the Invention

In the above-mentioned third alternative embodiment of the invention, fourth alternative embodiment of the invention, and fifth alternative embodiment of the invention, when a pressure difference occurs in the hydraulic oil in the first port 31 and the second port 32 due to the usage state of the hydraulic actuator or the like, it is sufficient that the first port 31 (or the second port 32) on the side where the first check valve 21 (second check valve 22) is present is set to be on the high pressure side, and the second port 32 (or the first port 31) on the side where the first on-off valve 61 (second on-off valve 62) is present is set to be on the low pressure side.

Seventh Alternative Embodiment of the Invention

The first pilot valve 11 and the second pilot valve 12 may be configured to be mechanically operated by an operation lever (not shown) or the like operated by an operator, instead of being of an electromagnetically-operated type.

INDUSTRIAL APPLICABILITY

The control valve unit of the present invention is applicable not only to a front loader 13 (work device) of a tractor, but also to a double-acting hydraulic cylinder or double-acting hydraulic motor (corresponding to a hydraulic actuator) that moves another work device (e.g., a leaf remover, mower, etc.) up and down or left and right.

The present invention is applicable not only to a control valve unit installed in a tractor (work vehicle), but also to a control valve unit installed in another agricultural machine (work vehicle) such as a rice transplanter, a combine, and a mower, and a construction machine (work vehicle) such as a backhoe, a wheel loader, a skid steer loader, and a compact truck loader.

DESCRIPTION OF REFERENCE SIGNS

10 Control valve
10U First position
10D Second position
10N Neutral position
11 First pilot valve
11*a* First supply position
12 Second pilot valve
12*a* Second supply position
17 Hydraulic actuator
20 Pump port
21 First check valve (first operation valve) (check valve)
22 Second check valve (second operation valve)
24 Tank port
41 First oil passage
42 Second oil passage
51 First oil drain passage (oil drain passage)
52 Second oil drain passage (oil drain passage)
61 First on-off valve (first operation valve) (on-off valve)
61*a* First open position (second open position)
61*b* First closed position (second closed position)
62 Second on-off valve (second operation valve) (on-off valve)
62*a* Second open position
62*b* Second closed position

The invention claimed is:

1. A control valve unit comprising:

a pump port;

a tank port;

a first oil passage and a second oil passage configured to connect to a double-acting hydraulic actuator;

a pilot-operated control valve including (i) a first position at which the first oil passage and the pump port are connected to each other and the second oil passage and the tank port are connected to each other, (ii) a second position at which the second oil passage and the pump port are connected to each other and the first oil passage and the tank port are connected to each other, and (iii) a neutral position, the control valve biased to the neutral position;

a pilot-operated first operation valve configured to be operated to (i) a first closed position at which the first oil passage and the tank port are disconnected from each other, and (ii) a first open position at which the first oil passage and the tank port are connected to each other;

a pilot-operated second operation valve configured to be operated to (i) a second closed position at which the second oil passage and the tank port are disconnected from each other, and (ii) a second open position at which the second oil passage and the tank port are connected to each other;

a first pilot valve configured to be operated to a first supply position at which pilot hydraulic oil is supplied to a port in the control valve configured to operate the control valve to the first position and a port in the second operation valve configured to operate the second operation valve to the second open position; and a second pilot valve configured to be operated to a second supply position at which pilot hydraulic oil is supplied to a port in the control valve configured to operate the control valve to the second position and a port in the first operation valve configured to operate the first operation valve to the first open position, and wherein in response to the first pilot valve being operated to the first supply position and the second pilot valve being operated to the second supply position, the control valve is operated to the neutral position, the first operation valve is operated to the first open position, and the second operation valve is operated to the second open position.

2. The control valve unit according to claim 1, wherein:

the control valve is configured in such a manner that at the neutral position, the first oil passage and the second oil passage are connected to the tank port, the first operation valve is a pilot-operated first check valve that is provided on the first oil passage, and in response to being operated to the first closed position, allows flow of hydraulic oil from the control valve to the hydraulic actuator and blocks flow of hydraulic oil from the hydraulic actuator to the control valve, and upon receiving supply of pilot hydraulic oil, is operated to the first open position and allows flow of hydraulic oil from the hydraulic actuator to the control valve, and the second operation valve is a pilot-operated second check valve that is provided on the second oil passage, and in response to being operated to the second closed position, allows flow of hydraulic oil from the control valve to the hydraulic actuator and blocks flow of hydraulic oil from the hydraulic actuator to the control valve, and upon receiving supply of pilot hydraulic oil, is operated to the second open position and allows flow of hydraulic oil from the hydraulic actuator to the control valve.

3. The control valve unit according to claim 1, further comprising:

a first oil drain passage connecting the first oil passage and the tank port;

and a second oil drain passage connecting the second oil passage and the tank port, and wherein:

the control valve is configured in such a manner that at the neutral position, the first oil passage and the tank port are disconnected from each other and the second oil passage and the tank port are disconnected from each other, the first operation valve is a pilot-operated first on-off valve that is provided on the first oil drain passage, is configured to be operated to (i) the first closed position at which the first oil drain passage is blocked and (ii) the first open position at which the first oil drain passage is connected, is biased to the first closed position, and upon receiving supply of pilot hydraulic oil, is operated to the first open position, and the second operation valve is a pilot-operated second on-off valve that is provided on the second oil drain passage, is configured to be operated to (i) the second closed position at which the second oil drain passage is blocked and (ii) the second open position at which the second oil drain passage is connected, is biased to the second closed position, and upon receiving supply of pilot hydraulic oil, is operated to the second open position.

4. The control valve unit according to claim 1, further comprising:

an oil drain passage connecting the second oil passage and the tank port, and wherein:

the control valve is configured in such a manner that at the neutral position, the first oil passage and the tank port are connected to each other and the second oil passage and the tank port are disconnected from each other, the first operation valve is a pilot-operated check valve that is provided on the first oil passage, and in response to being operated to the first closed position, allows flow of hydraulic oil from the control valve to the hydraulic actuator and blocks flow of hydraulic oil from the hydraulic actuator to the control valve, and upon receiving supply of pilot hydraulic oil, is operated to the first open position and allows flow of hydraulic oil from the hydraulic actuator to the control valve, and the second operation valve is a pilot-operated on-off valve that is provided on the oil drain passage, is configured to be operated to (i) the second closed position at which the oil drain passage is blocked and (ii) the second open position at which the oil drain passage is connected, is biased to the second closed position, and upon receiving supply of pilot hydraulic oil, is operated to the second open position.

* * * * *